United States Patent
Friesel

(10) Patent No.: US 8,223,065 B1
(45) Date of Patent: Jul. 17, 2012

(54) METHODS AND SYSTEMS FOR PARTITIONING A RADAR ACQUISITION VOLUME

(75) Inventor: Mark Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/885,653

(22) Filed: Sep. 20, 2010

Related U.S. Application Data

(63) Continuation-in-part of application No. 12/208,588, filed on Sep. 11, 2008.

(51) Int. Cl.
*G01S 13/00* (2006.01)
(52) U.S. Cl. .......................................... 342/95; 342/205
(58) Field of Classification Search .................... 342/95, 342/205
See application file for complete search history.

(56) References Cited

U.S. PATENT DOCUMENTS

| | | | |
|---|---|---|---|
| 4,467,447 A | 8/1984 | Takahashi et al. | |
| 5,890,012 A | 3/1999 | Poisner | |
| 7,184,036 B2 | 2/2007 | Dimsdale et al. | |
| 7,221,307 B1 | 5/2007 | Friesel | |
| 7,427,947 B1 * | 9/2008 | Dark et al. | 342/173 |
| 2006/0202886 A1 | 9/2006 | Mahapatra et al. | |
| 2007/0018882 A1 | 1/2007 | Manoogian et al. | |
| 2008/0153414 A1 | 6/2008 | Ho et al. | |
| 2008/0210016 A1 | 9/2008 | Zwirn et al. | |

* cited by examiner

*Primary Examiner* — Timothy A Brainard
(74) *Attorney, Agent, or Firm* — Howard IP Law Group, PC

(57) ABSTRACT

A method according to an aspect of the disclosure is for partitioning a radar acquisition volume, the method comprising the steps of: determining an allocated time to search an unpartitioned volume; determining a number of beam rows in an unpartitioned acquisition face; determining an average per-row search time for searching the angular region based on the determined allocated time and determined number of beam rows in an unpartitioned acquisition face; determining a number of beam rows in an allotted acquisition period that is searchable based on the average per-row search time; calculating a maximum elevation extent based on the number of beam rows in the allotted acquisition period; and searching an angular extent of the search volume based on the calculated maximum extent.

15 Claims, 10 Drawing Sheets

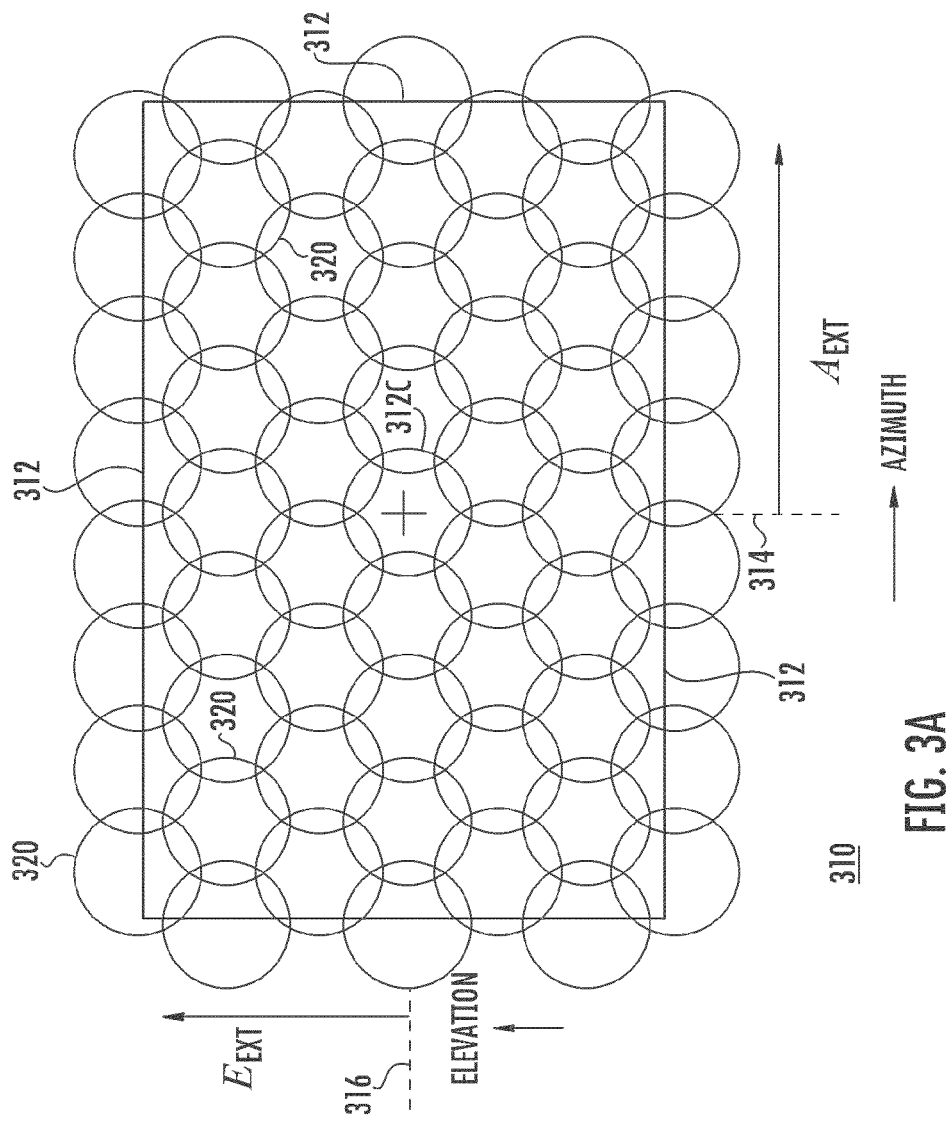

US 8,223,065 B1

METHODS AND SYSTEMS FOR PARTITIONING A RADAR ACQUISITION VOLUME

CROSS-REFERENCE TO RELATED APPLICATIONS

This application is a continuation-in-part of copending U.S. utility application entitled, "METHOD FOR SCANNING A RADAR SEARCH VOLUME WITHIN AN ALLOWABLE SCAN TIME," having Ser. No. 12/208,588, filed on Sep. 11, 2008, which is entirely incorporated herein by reference.

BACKGROUND

A naval radar system typically searches space under control of command and decision processing. It searches by means of a plurality of sequential directional beams which may be pointed in a given direction. Command and Decision determines the acquisition face to be searched. The acquisition face can be calculated using the azimuth and elevation centers and extents, among other data. The radar beam is directed to each angle so as to cover the entire search face. This type of searching is subject to time constraints, as the beam typically dwells at the current beam angle for a sufficient time for the transmitted radar signals or pulses to travel to the target, which might be at the maximum allowable range, and for the reflection to return to the radar. The round-trip time is the well-know 12.4 microseconds per mile of target range. Thus, the beam dwells at each angle of the search face for a sufficient length of time to detect a target at the maximum range, and then move on to the next angle within the search beam pattern.

The angular area covered by a single radar beam is typically smaller than an acquisition face. Each beam is sufficient to search the area it covers between the range limits of the search volume. Therefore to search the volume, a pattern of sequential beams can be sufficient to cover the acquisition face.

To keep the radar system in use, as when searching multiple volumes in the case of multiple potential targets, it is typical to limit the amount of time spent searching a given volume. Because the radar may have multiple, equal priority tasks, the radar time/usage is scheduled. The radar may have to search multiple volumes and provide updates on the positions of detected targets. The system aborts the search of a volume of space after a given time. Consequently, a search through a volume of space may be initiated and aborted without being completed. This operation may result in a failure to locate a target within the specified scan volume. In order to avoid having a scan aborted and the resulting problems, it is useful that the searching of any given volume be performed in the least possible time.

The naval radar system can operate in a volume search mode. When information becomes available from another source, such as a cooperating radar, about the possible presence of a target in a nominal given direction or location, it may be desired to examine a volume about the nominal given direction in an attempt to acquire the target. This is termed a "cued" search. If the selected volume is too large, the search may time-out before completion of the search, and if too small, may not find the relevant target(s).

Improved or alternative arrangements are desired for establishing the angular extent of the search volume about the cued nominal direction of a target to guarantee that the search can be accomplished within given time constraints.

SUMMARY

A method according to an aspect of the disclosure is for partitioning a radar acquisition volume, the method comprising the steps of: determining an allocated time to search an unpartitioned volume; determining a number of beam rows in an unpartitioned acquisition face; determining an average per-row search time for searching the angular region based on the determined allocated time and determined number of beam rows in an unpartitioned acquisition face; determining a number of beam rows in an allotted acquisition period that is searchable based on the average per-row search time; calculating a maximum elevation extent based on the number of beam rows in the allotted acquisition period; and searching an angular extent of the search volume based on the calculated maximum extent.

BRIEF DESCRIPTION OF THE DRAWING

FIG. 3A is a view of a representative search face.

DETAILED DESCRIPTION

Prior arrangements for determining the number of beams required in a fixed pattern about the cued direction have tended to give numbers that, in some cases, were greater than desired. As a result, the cued searching of the radar in these cases might exceed the maximum search time, thereby causing the search to be aborted.

Figure 1:
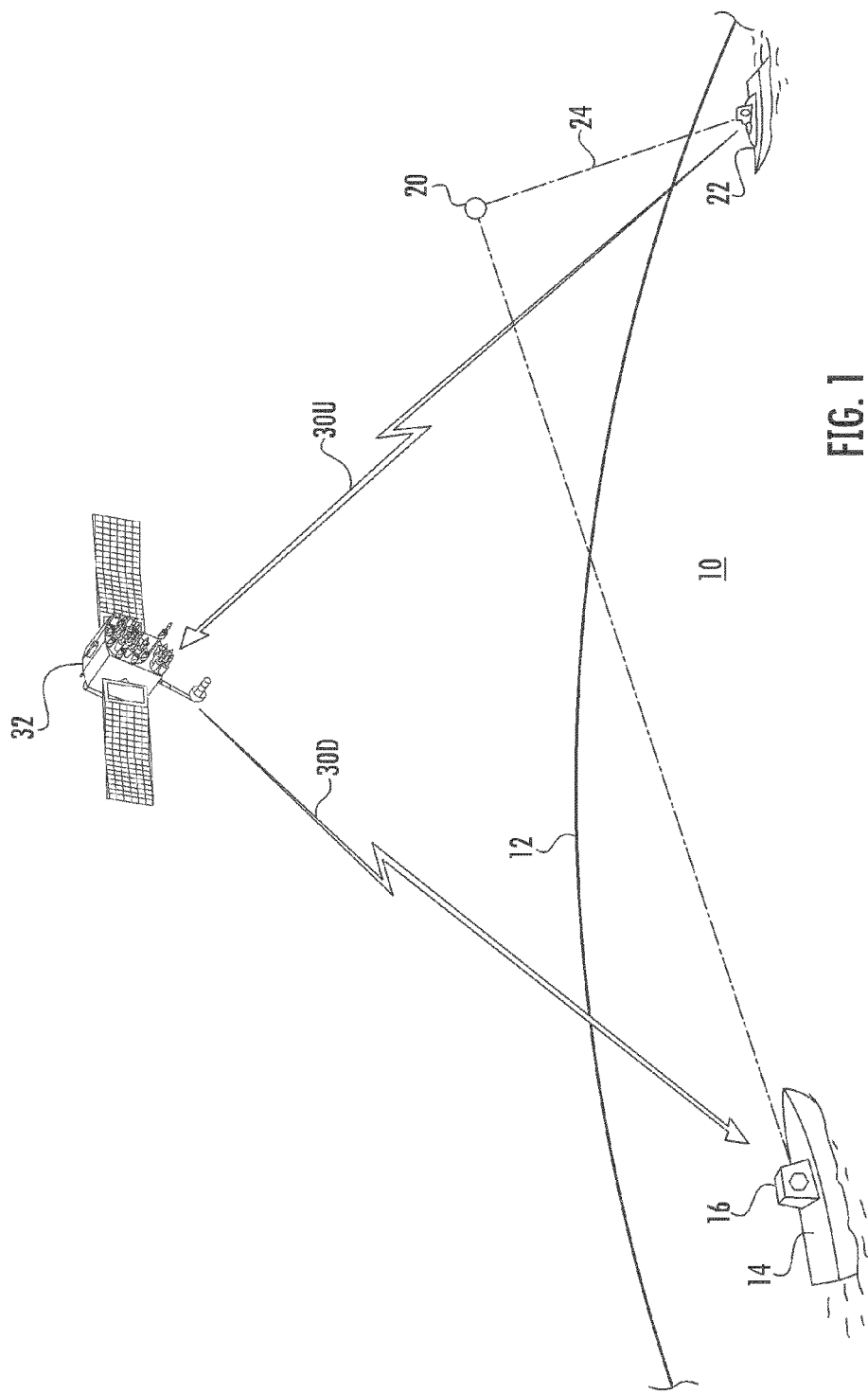
FIG. 1 is a simplified representation of a scenario in which a radar-equipped ship receives cue information relating to a target from a remote sensor.

In the scenario 10 of FIG. 1, a line 12 defines the horizon. A ship (ownship) 14 carries a radar system, portions of which are illustrated as 16. A target 20 is at a distance from ownship 14, and is observed along a line-of-sight 24 by means of sensors (not separately illustrated) mounted on a ship 22. Ship 22 obtains information about the location of target 20. Since ship 14 (and possibly other ships and assets associated with ship 22) may not be aware of the presence of target 20, ship 22 transmits coordinates of the target to other assets and in particular to ship 14. This transmission may be made by any communication path, such as, for example, the uplink 30U and downlink 30D associated with a communication spacecraft 32. Processing aboard ship 22 may evaluate the quality of the target, and transmit target quality or error information together with the target coordinates.

Figure 2:
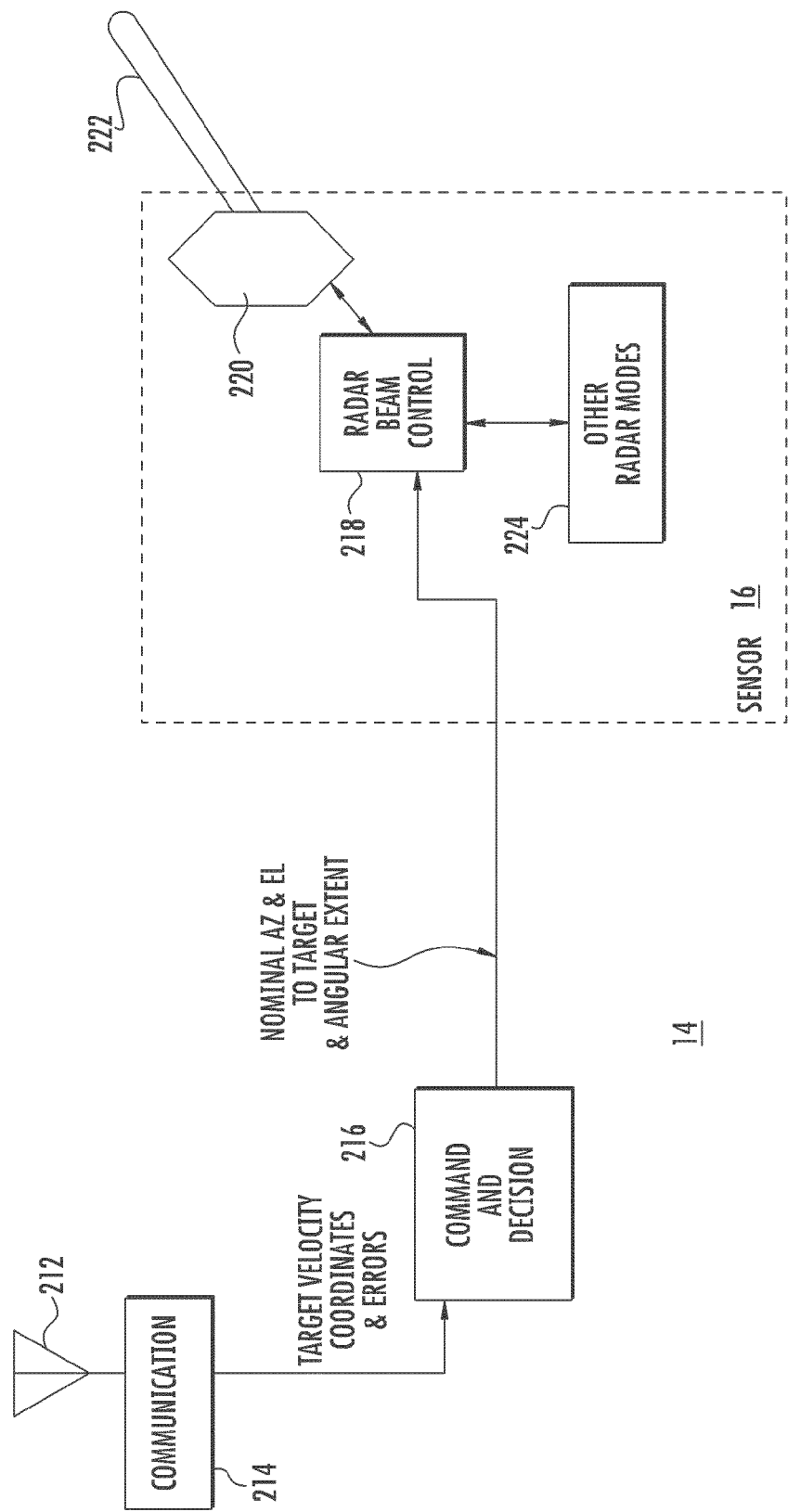
FIG. 2 is a simplified block diagram illustrating various shipboard functions relating to sensor acquisition of the target of FIG. 1.

In FIG. 2, ship 14 includes a communication antenna 212 which is intended for communication with other assets, including the communication represented in FIG. 1 by path 30D. This communication, including information relating to the location of target 20 and the errors associated with the location, is coupled to a command and decision function, illustrated as a block 216. Block 216 of ship 14 processes the location information from ship 22 of FIG. 1, and from this location information determines the target azimuth and elevation angle relative to ownship 14, and the azimuth and elevation extent of the search or acquisition face required to acquire the target with its own sensors.

The target azimuth and elevation relative to ownship 14 of FIG. 2, and the azimuth and elevation extent of the acquisition face (see FIG. 3A) required by the errors in target azimuth and elevation, are transmitted from Command and Decision block 216 to an ownship radar beam control illustrated as a block 218. Radar beam control 218 commands the generation of transmit and receive beams by antenna face 220. These beams are "pencil" or narrow beams, as known in the art. A representative pencil beam is illustrated as 222. Radar beam control 218 may also receive commands from other functional modes, such as wide-area search modes, illustrated together as a block 224.

The radar beam controller 218 of FIG. 2, together with the antenna face 220, produces sequential pencil beams in directions which, in conjunction with other pencil beams, suitably search the volume of space defined by the combination of an acquisition face in conjunction with the desired range.

FIG. 3A is a representation of a search or acquisition face 310 generated by sequential beam generation by the radar sensor 16 of FIG. 2. The azimuth and elevation directions are indicated. The acquisition face can be generated by a shipboard function. The sequential beams are generated and placed so as to cover the acquisition face. In FIG. 3A, the nominal target azimuth and elevation, as specified by the target azimuth and elevation angle relative to ownship 14 generated by block 216, appears as a + symbol at the center of the acquisition face 310. A "cross-section" of each pencil beam is illustrated as a circle. Representative circles are designated by the number 320. The pencil beams are directed so that the beams overlap at a given power level. The area of the beam is defined by the minimum power level. The overlap can be selected to ensure that the entire acquisition face is covered. This overlap is indicated in FIG. 3A by the overlap of the circles. Those skilled in the art will understand that the "magnitude" of the overlap depends upon the "beamwidth" of the beams, the relative placement of the beam centers by the radar, and the attenuation or "signal" level at the overlap. Also in FIG. 3A, the overlapping beams provide coverage of a region defined by a rectangular outline 312. The azimuth "extent" of the coverage region is defined by the arrow designated $A_{ext}$, extending in the horizontal direction from a vertical centerline 314 to the outline 312. The elevation "extent" of the coverage region is defined by the arrow designated $E_{ext}$, extending in the elevation or vertical direction from a horizontal centerline 316 to the outline 312.

It should be understood that the number of pencil beams can be selected somewhat arbitrarily, in order to cover the desired acquisition face. That is, due to unavoidable errors in determining the exact location of the target, and due to errors in determining the direction in ownship local coordinates, the target may not be found at the precise specified cue coordinates. In order to acquire and track the target with ownship radar, it is desirable to search a region or extent about the nominal target local coordinates. Thus, the search or acquisition face to be searched by ownship radar to acquire target 20 is defined by the reported coordinates as converted to local (ownship) coordinates, and further as affected by the reported errors accompanying the target coordinates. Thus, the extent will in general be different for each cued target.

Figure 3B:
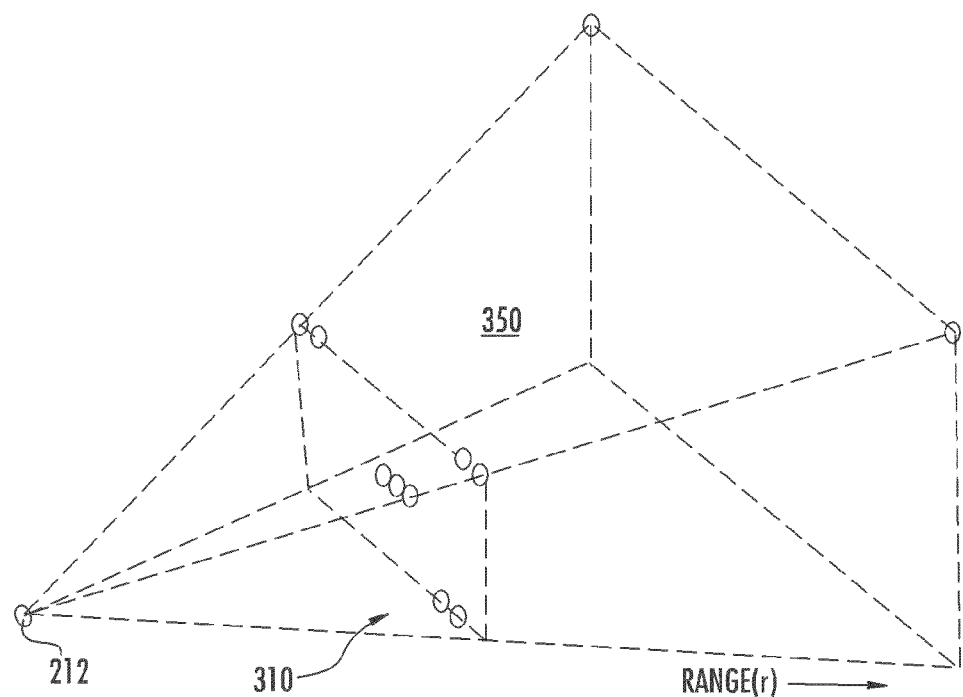
FIG. 3B is a representation of the search face of FIG. 3A with the addition of range as a parameter.

A naval radar system can place an initial search beam designated 312C dead-center in the acquisition face, indicated in FIG. 3A by "+". Subsequent beams are placed to produce a regular pattern of partially overlapping beams that completely covers the acquisition face. The pattern may be described in a number of ways. One way of describing the pattern is as a line of equally spaced beam centers extending azimuthally to the edge of the search region. The line at elevation center (the line containing "+") contains the initial beam 312C and always has an odd number of beams. The azimuthal beam center separation is $2\Delta A$ where $\Delta A=(\beta/2)\cos\alpha$, where $\beta$ is the beam width and $\alpha$ is derived from the beam placement pattern, and is typically equal to 30 degrees. More specifically, $\alpha$ is equal to ½ the acute angle between the two lines that extend from the center of a radar beam to the points of intersection of the circumference of the beam with the circumference of an adjacent beam. This is an angular measure, often given in degrees. The relationship of the search or acquisition face to the overall search volume associated with the face is illustrated in FIG. 3B. In FIG. 3B, the search face is designated as 310, and the range provides a third dimension which defines the search volume.

Figure 4:
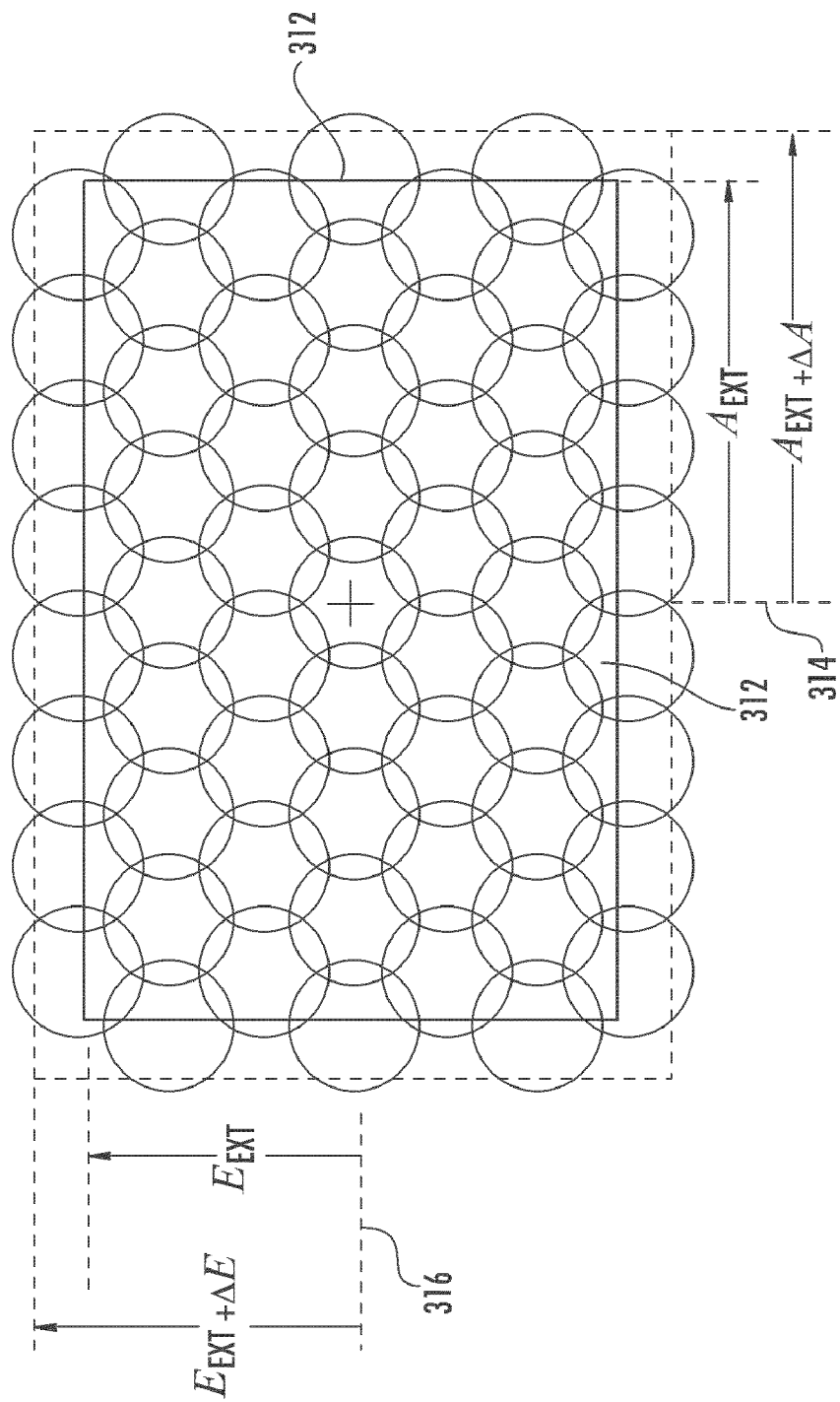
FIG. 4 is a view of the search face of FIG. 3A with additional boundaries.

According to an aspect of the disclosure, the azimuth extent $A_{ext}$ about the cued direction is increased or extended over and above that required by noise or errors to $A_{ext}+\Delta A$ in order to accommodate edge search, and the elevation extent $E_{ext}$ is increased or extended to $E_{ext}+\Delta E$, as illustrated in FIG. 4. A beam is "counted" as being in the search face if its center falls within the extended azimuth range. Clearly, if $$(A_{ext}+\Delta A)/2\Delta A<1 \quad (2)$$

there is only one search beam on the azimuth line. In this case, the number of beams in a line in the azimuth direction is one. This can only occur in the rows at elevation center, and in alternate rows above and below that at elevation center. It should be noted that a column of single beams is triggered by an azimuth threshold—a special case addressed using independent processing, not described herein and of no relevance to the disclosure. If $$1\leq(A_{ext}+\Delta A)/(2\Delta A)<2 \quad (3)$$

there are 2*1+1=3 beams, because one beam is added on each side of center.

By extension, letting parameter $n_A=0, 1, \ldots$, there are $2n_A+1$ beams in the line if $$n_A\leq(A_{ext}+\Delta A)/(2\Delta A)<n_A+1 \quad (4)$$

The corresponding functional equation, that can be used to compute the number of beams in selected horizontal lines for any azimuth extent, is given by $$2n_A+1 = 1+2flr\left[\frac{A_{ext}+\Delta A}{2\Delta A}\right] = 1+2flr\left[\frac{A_{ext}}{2\Delta A}+\frac{1}{2}\right] \quad (5)$$

where:
the floor (flr) function truncates the argument to the highest integer less than the argument; and
$\Delta A$ is the spacing between beams in the azimuth direction.

For all remaining horizontal beam lines, e.g. those centered at $\pm\Delta E, \pm3\Delta E, \ldots$, of FIG. 4, the number of beams is $2m_A$. The horizontal line of beams located $\Delta E$ above the line at elevation center in FIG. 4 has beam centers at $(1+2m_A)\Delta A$ to $A_{ext}+4\Delta A$ for $m_A = 1, 2, \ldots$. Consequently, the number of beam positions in this line is always even. There are $2m_A$ beams in the line if $$m_A(A_{ext}+2\Delta A)/2\Delta A < m_A+1 \tag{6}$$

The azimuth extension $\Delta A$ provides assurance that there will be beam centers at least at $\pm\Delta A$ corresponding to $m_A=1$. Since all arguments are positive, the corresponding functional representation of the beam count and conditions is $$2m_A = 2flr\left(\frac{A_{ext}+2\Delta A}{2\Delta A}\right) = 2\left[1+flr\left(\frac{A_{ext}}{2\Delta A}\right)\right] \tag{7}$$

Equations (5) and (7) hold also in elevation, with the simple change of $E_{ext}$ and $\Delta E$ replacing $A_{ext}$ and $\Delta A$, respectively. Thus, in elevation, $$2n_E + 1 = 1 + 2flr\left[\frac{E_{ext}+\Delta E}{2\Delta E}\right] = 1 + 2flr\left[\frac{E_{ext}}{2\Delta E}+\frac{1}{2}\right] \tag{8}$$

and $$2m_E = 2flr\left[\frac{E_{ext}+2\Delta E}{2\Delta E}\right] = 2\left[1+flr\left(\frac{E_{ext}}{2\Delta E}\right)\right] \tag{9}$$

The number of beam positions in odd and even elevation columns or "lines" is given by $2n_E+1$ and $2m_E$, respectively. It can easily be seen from FIG. 4 that the number of azimuth lines with an odd number of beam positions is the number of beam positions in an odd-number elevation line. Similarly, the number of azimuth lines with an even number of beam positions is the number of beam positions in an even-numbered elevation line. The total number of beam positions is therefore $$N=(2n_A+1)(2n_E+1)+(2m_A)(2m_E) \tag{10}$$

Figure 6:
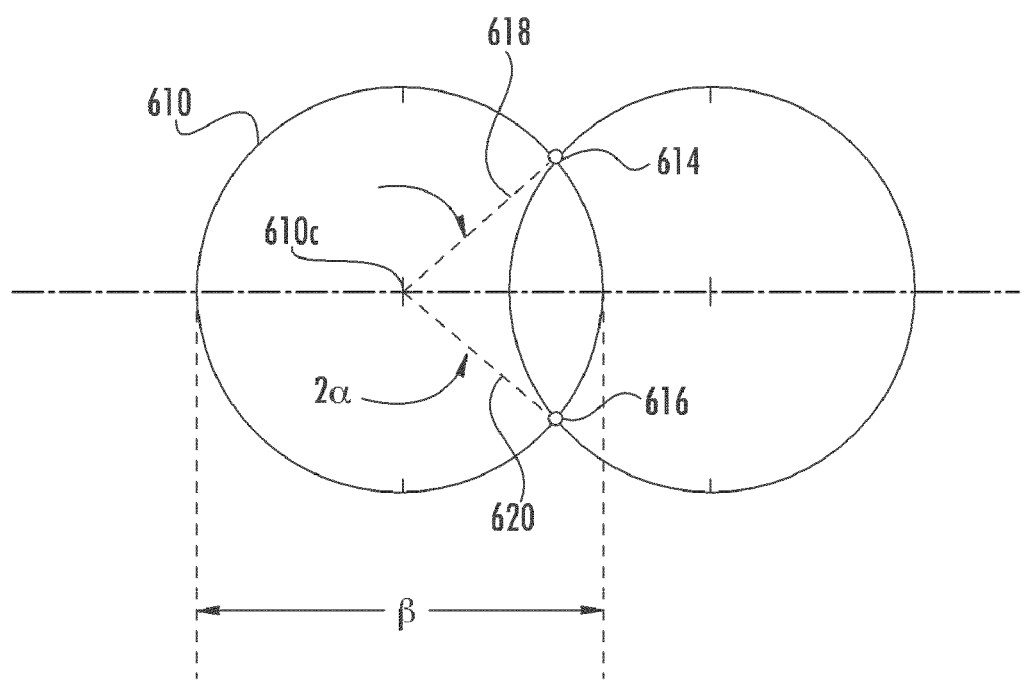
FIG. 6 illustrates geometry associated with two overlapping antenna beams.

According to an aspect of the disclosure, the number N of beams required to cover acquisition face is given by $$N = \left[1+2flr\left(\left(\frac{A_{ext}}{2\Delta A}\right)+\left(\frac{1}{2}\right)\right)\right]\left[1+2flr\left(\left(\frac{E_{ext}}{2\Delta E}\right)+\left(\frac{1}{2}\right)\right)\right] + 4\left[1+flr\left(\frac{A_{ext}}{2\Delta A}\right)\right]\left[1+flr\left(\frac{E_{ext}}{2\Delta E}\right)\right] \tag{11}$$

where:
$A_{ext}$ is half the total azimuth extent of the search face;
$E_{ext}$ is half the total elevation extent of the search face;
$\Delta A$ is the azimuth separation of the line of centers of adjacent horizontal columns;
$\Delta E$ is the elevation separation of the line of centers of adjacent horizontal rows;
$\Delta E = (\beta/2)(1+\sin\alpha)$;
flr is a floor function that truncates the argument to the highest integer less than the argument; and
$\Delta A = (\beta/2)\cos\alpha$, where $\beta$ is the beam width of a single beam and $\alpha$ is equal to ½ the acute angle between the two lines that extend from the center of a radar beam to the points of intersection of the circumference of the beam with the circumference of an adjacent beam. In FIG. 6, $\beta$ is indicated by the diameter of the beam 610 and the intersection of beam 610 with adjacent beam 612 is identified as points 614 and 616. The angle subtended between lines 618 and 620 extending from beam center 610C to points 614 and 616, respectively, is $2\alpha$.

As mentioned, $\Delta A$ is the azimuthal (horizontal) distance between beam centers of adjacent beam columns, that is, between the center of a beam and the center of the adjacent beam in the row above or below, and not between beam centers in a given row. Similarly, $\Delta E$ is the elevation (vertical) distance between beam centers of adjacent rows, i.e. between the center of a beam and the center of the adjacent beam in the row above or below it. In the representative acquisition face of FIG. 4, the azimuth extent is $7\Delta A+\delta$ where $\delta<\Delta A$, and the elevation extent is $2\Delta E+\epsilon$, where $\epsilon<\Delta E$. Substitution into equation (1) gives $$N=[1+2*4]*[1+2*1]+4*[1+3][1+1]=9*3+4*4*2=59 \tag{12}$$

As can be observed by counting beams in FIG. 4, the calculated number of beams matches the actual number in the example.

Figure 5:
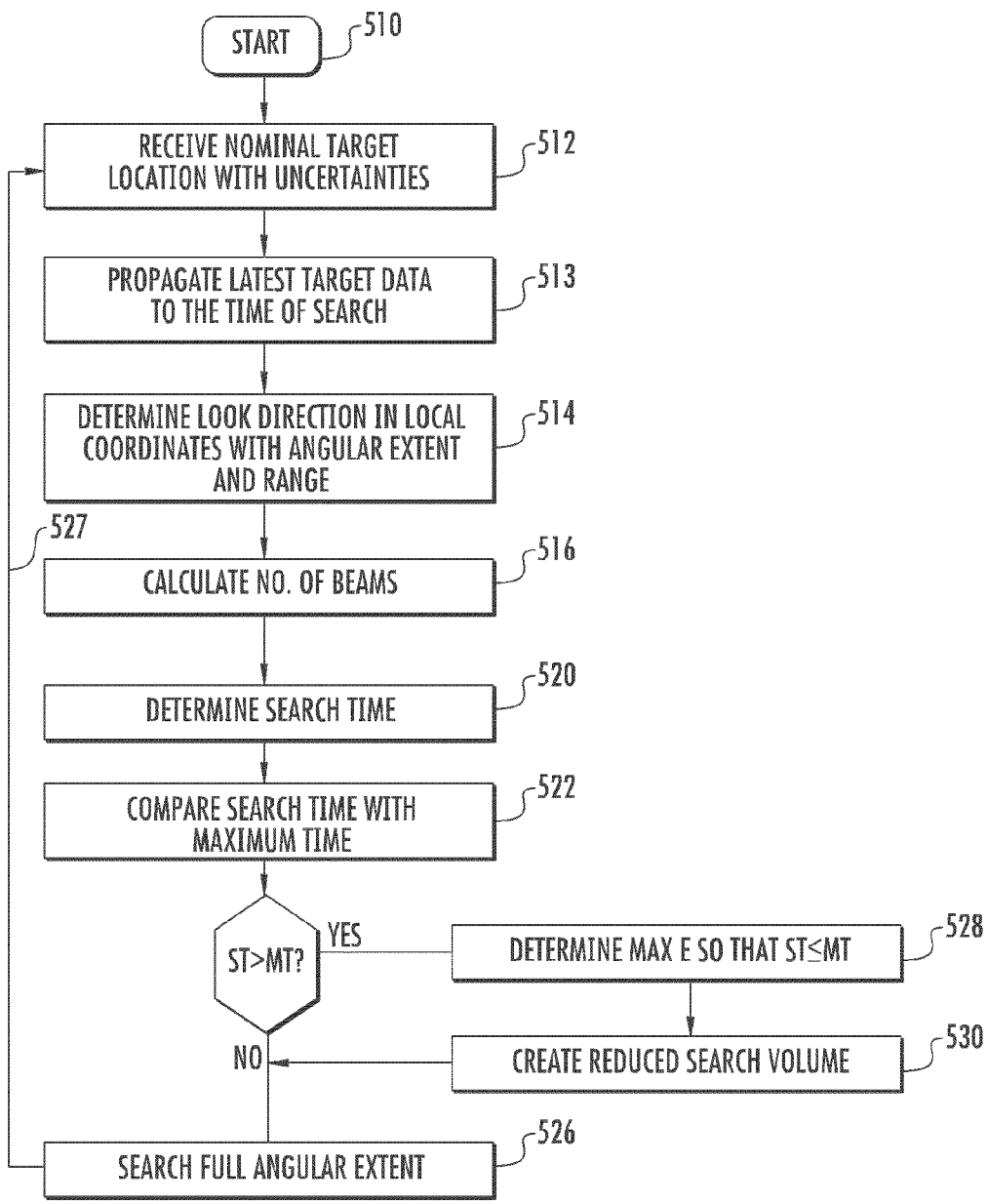
FIG. 5 is a flow chart illustrating steps according to an aspect of the disclosure.

FIG. 5 is a simplified logic or functional flow chart or diagram 500 illustrating a method according to an aspect of the disclosure. In FIG. 5, logic 500 begins at a START block 510, and the logic flows to a block 512. Block 512 represents acquisition of cued target information, e.g., nominal target location, together with error information or uncertainties. This may be accomplished as described in conjunction with FIG. 1. From block 512 of FIG. 5, the logic flows to a block 513, which represents propagation of the latest target data to the time of search. The target data can be calculated by replacing the minimum elevation of the acquisition face with the maximum elevation of the previous partition. Block 514 represents determination from the cue information of the location of the target relative to ownship, and calculation of the azimuth and elevation extent of the acquisition face. Block 516 represents the calculation of the number of beams required to fill the acquisition face, using equation (1). The beam number calculation can be done every time the target data is propagated to search time, and after the minimum elevation is replaced if the previous volume was partitioned. When a volume is partitioned, the number of beams is not recalculated for the partition. It is not enough to determine the number of beams in the search region. As mentioned, it is necessary to determine the time required to accomplish the search, taking into account the number of beams and the range. The range of the search volume can be determined using a method that is known in the art in order to estimate search time per beam. Command and decision block 216 of FIG. 2 multiplies the range-dependent time with (or by) the number of beams, as suggested by block 520 of FIG. 5, and arrives at a scan or search time for the number of beams associated with the acquisition face.

Block 522 of FIG. 5 represents the comparison of the scan or search time with the maximum allowable time. If the search time is longer than the maximum allowable time, the search aborts. A decision block 524 evaluates the comparison. The logic leaves decision block 524 by the NO output if the scan time is less than the maximum time. From the NO output of decision block 524, the logic flows to a block 526, representing the searching of the full extent. Once the search of the full extent has begun, the logic can return by a logic path 527 from block 526 to block 512 to acquire new cue information for processing during the next scan.

If decision block 524 finds that the scan of the full extent will exceed the maximum time, the logic leaves the decision block by the YES output, and flows to a further block 528.

Block 528 creates a modified search volume, by calculating a maximum search elevation such that the search time of this modified volume will be less than or equal to the maximum search time. The number of beams is not used to calculate the modified search volume. The new extent $E_{ext\_new}$ is found from(ST/MT) times $E_{ext}$, where ST is the search time of the unmodified volume, $E_{ext}$ is the extent of the unmodified acquisition face, and MT is the maximum allowed search time. The maximum search elevation can now be used to derive the allotted acquisition period for searching the modified volume.

From block 528, the logic 500 of FIG. 5 flows to a block 530, which creates a reduced search volume. One way is that the elevation center of the modified acquisition face can be calculated as the unmodified minimum elevation plus $E_{ext\_new}$. The maximum elevation defined by the partitioning equations replaces the maximum elevation of the unpartitioned search volume. After the partition is searched, this partition maximum defines the minimum elevation of the next acquisition volume. The subsequent processing is otherwise the same as for the first acquisition volume. This process continues until the entire volume is searched or the search is aborted by other considerations not relevant to this application.

Creating partitions may be avoided given, for example, that the acquisition face (angular extents) is partitioned into searchable volumes using the described or other methods and that the radar can search partitions sequentially. The current partition is described by modified center and extents, and sent to the radar.

One method is that after a partition is searched, a new volume is created from the latest cue data. The max elevation of the partition volume replaces the minimum elevation of the unpartitioned volume, the extents and center are calculated, the number of beams and search time are determined all as described earlier, and the volume can be partitioned again if applicable. Thus, the maximum extent that can be searched by the radar system can be calculated for the allotted acquisition period $t_{acq\_per}$ and thereby minimizes the number of partitions required to search a volume and provides an accurate calculation of the remaining unpartitioned acquisition volume. Such method is further described in connection to FIGS. 7, 8A and 8B.

The logic then leaves block 530 and enters block 526, where the modified acquisition volume is searched. The logic then leaves block 526 and re-enters block 514. In block 514 the unmodified acquisition volume is updated to the current time, and re-calculated. The minimum elevation of the recalculated volume is replaced with the maximum elevation of the previous modified volume. The logic then leaves block 514 and enters block 516 to begin another iteration from block 514 through 526. These iterations continue until the entire unmodified volume is searched.

A method according to an aspect of the disclosure is for searching an angular acquisition region (350) of the radar acquisition or search volume about a given cued direction (+) and with a given maximum search range (r). The radar search of the designated volume is performed with sequentially generated radar beams (222) having defined beamwidths (β). The method comprises the steps of acquiring (214, 512) the nominal track position and velocity (cue information) and time, and error information describing the uncertainty in the cue information. This error information may be presented together with the cue information. From the error information, the azimuth (Az) and elevation (El) extent (the acquisition or search face) of the search volume (350) about the cue direction (+) is determined (514). If necessary, the angular extent of each beam in the azimuth and elevation directions is determined from the beamwidths. From the angular extents in azimuth and elevation for each beam, the number of beams required to cover the acquisition face is determined (516), as by use of equation (1). The dwell time for each of the beams is determined from the search range (518, 520). The search time is determined as the product of the number of beams multiplied by the dwell time per beam. The search time is compared (522, 524) with the maximum allowable search time, and radar scanning over the acquisition face is initiated (526) with the calculated number of beams if the search time is less that the maximum allowable search time. The acquisition or search face is partitioned into sub-search-faces (528, 530) if the search time is greater than the maximum allowable search time. When the search time has been reduced to less than the maximum allowable search time, radar scanning of each of the sub-search-faces is initiated (526). In a preferred mode of the method, the number of beams N is calculated as $$N = \left[1 + 2flr\left(\left(\frac{A_{ext}}{2\Delta A}\right) + \left(\frac{1}{2}\right)\right)\right]\left[1 + 2flr\left(\left(\frac{E_{ext}}{2\Delta E}\right) + \left(\frac{1}{2}\right)\right)\right] + 4\left[1 + flr\left(\frac{A_{ext}}{2\Delta A}\right)\right]\left[1 + flr\left(\frac{E_{ext}}{2\Delta E}\right)\right] \quad (13)$$

where:

$A_{ext}$ is half the azimuth extent of the search face;

$E_{ext}$ is half the elevation extent of the search face;

$\Delta A$ is the azimuthal beam separation at constant elevation;

$\Delta A = (\oplus/2)\cos\alpha$, where β is the beam width and α is derived from the beam placement pattern according to well-known art, typically equal to 30 degrees;

$\Delta E$ is the elevation separation of the line of centers of the horizontal rows;

$\Delta E = (\beta/2)(1 + \sin\alpha)$; and flr is a floor function that truncates the argument to the highest integer less than the argument.

Figure 7:
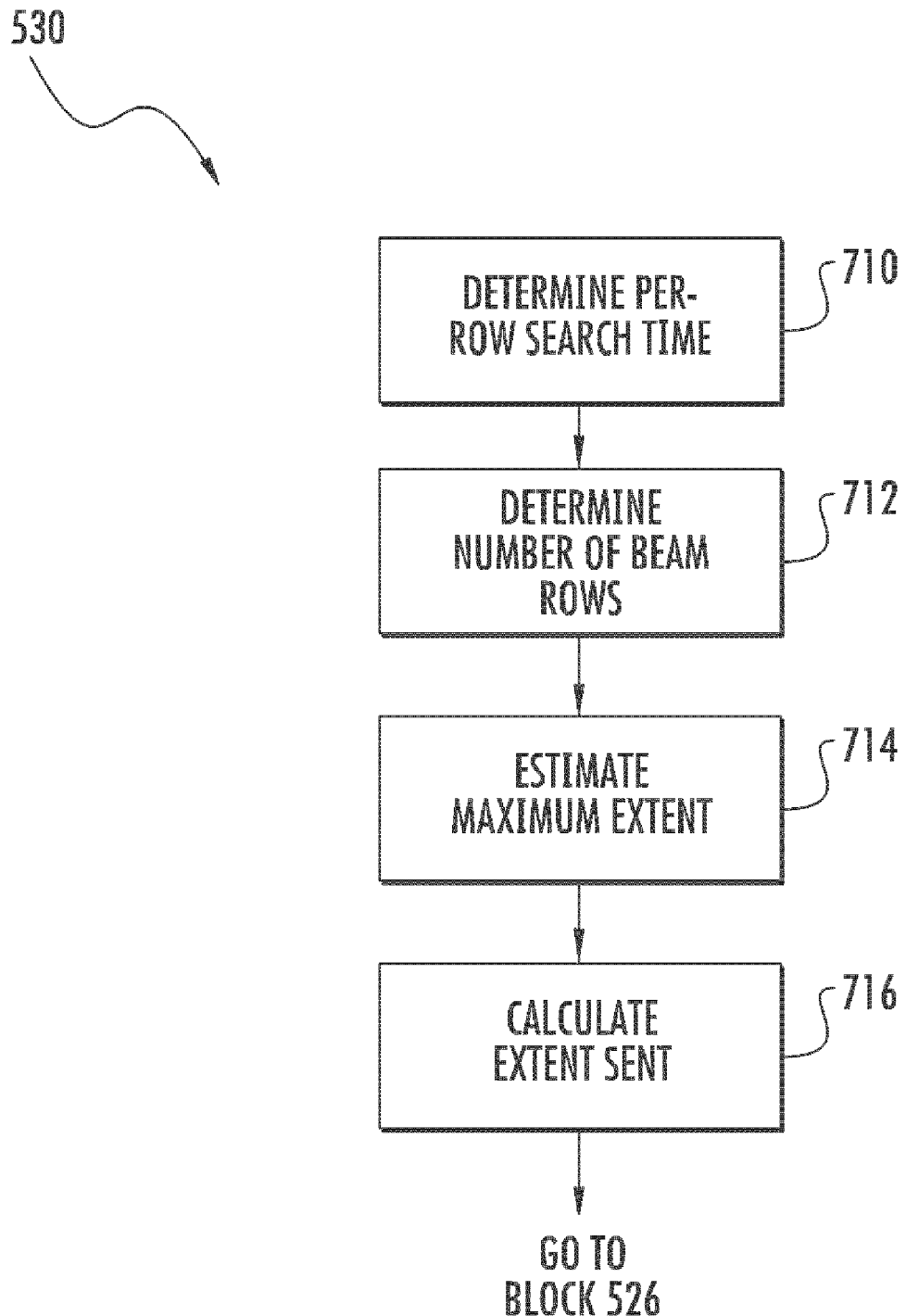
FIG. 7 is a flow chart illustrating exemplary steps of block 530, such as that shown in FIG. 5.

FIG. 7 is a logic or functional flow chart or diagram illustrating a method of block 530 (FIG. 5) according to an aspect of the disclosure. In FIG. 7, a method of calculating the maximum extent that can be searched by the naval radar system in an allotted acquisition period $t_{acq\_per}$, and thereby minimizes the number of partitions used to search a volume. The corresponding maximum elevation of the partitioned volume should be used as the minimum elevation of the unpartitioned volume when calculating the partition. The method of block 530 begins with block 710, which determines the average per-row search time $T_{avg}$ using the following equation.

$$T_{avg} = \frac{T_0}{2n_E + 1} \quad (14)$$

where $T_0$ is time allocated to search the unpartitioned volume and $(2n_E+1)$ refers to the number of beam rows that can be used to search the unpartitioned elevation extents. $n_E$ can be calculated as follows:

$$n_E = \text{ceiling}\left[\frac{E_{ext} - \frac{\beta}{2}\sin\alpha}{\Delta E}\right] \quad (15)$$

The parameter $\Delta E = (\beta/2)(1 + \sin\alpha)$ refers to the difference in elevation between the centers of adjacent beam rows; β and α are the parameters in $\Delta A$ and $\Delta E$ defined previously.

Block 712 calculates the number of beam rows that can be searched in the allotted acquisition period $t_{acq\_per}$ based on the condition that $(2k+T_{avg} \leq t_{acq\_per})$, $$k = \text{floor}\left[\frac{t_{acq\_per} - T_{avg}}{2T_{avg}}\right] \quad (16)$$

This facilitates determining the total time to search the calculated number of beam rows. In general, the total time to search the number of beam rows is less than the maximum search time. Because of the search pattern of the naval radar system the beam rows alternate between rows with s beams and rows with s+1 beams where s is an integer. In some cases an acquisition face with (2k+1) beam rows and outer rows containing s+1 beams may not be searchable within the allotted acquisition period $t_{acq\_per}$, but are searchable within the allotted acquisition period $t_{acq\_per}$ if the outer rows only contain s beams.

Some cases are more important than others and can be processed differently. For example, if an excess search time of one (1) dwell adversely affects search outcomes then an alternative processing can be as follows: Let $\delta_+(x)$ be a logical test for even numbers, the two outer rows contain s beams each if $m+n_E$ is odd, and otherwise the outside rows contain s+1 beams. Thus, the number of beam rows that can be searched can be expanded by using the following equation:

$$k = \text{floor}\left[\frac{t_{acq\_per} - T_{avg} + (-1)^{\delta_+(m+n_E)}\left(\frac{t_{dwell}}{2}\right)}{2T_{avg}}\right] \quad (17)$$

where $t_{dwell}$ is the time that the naval radar system dwells at each angle of the search face to detect a target at the maximum range.

Block 714 estimates the maximum elevation extent $E_{ext\_max}$ searchable by k beams, which can be calculated using the following equation:

$$E_{ext\_max} = k\Delta E + \frac{\beta}{2}\sin\alpha \quad (18)$$

where $\Delta E$ is the difference in elevation between the centers of adjacent beam rows. The maximum elevation extent is the total elevation angle of the partition search volume and is used by the naval radar system to perform the actual searching.

There may be some beam rows that have been accounted for in the previous calculation of beam rows, such as that shown in FIG. 4. Block 716 adds an elevation pad to an elevation extent sent. Elevation extent sent can be calculated by using the following equation:

$$E_{ext\_send} = k\Delta E - \epsilon \quad (19)$$

where $0 < \epsilon \leq \Delta E$ is selected within this range to ensure that the naval radar system can fit 2k+1 beam rows into the padded elevation range.

The revised elevation extent, $E_{extent\_revised}$, can be calculated using the following equation:

$$E_{extent\_revised} = 2E_{ext\_send} \quad (20)$$

The elevation center that is transmitted to the naval radar system can be calculated using the following equation:

$$E_{center\_revised} = E_{min} + E_{ext\_max} \quad (21)$$

where $E_{min}$ is the minimum elevation of the unpartitioned acquisition face, or maximum elevation extent, $E_{max}$, from the previous partition. The maximum elevation of the partition that is transmitted to the naval radar system can be calculated as $E_{center\_revised}$ $E_{ext\_send}$. The process goes to block 526 of FIG. 5.

Figure 8A:
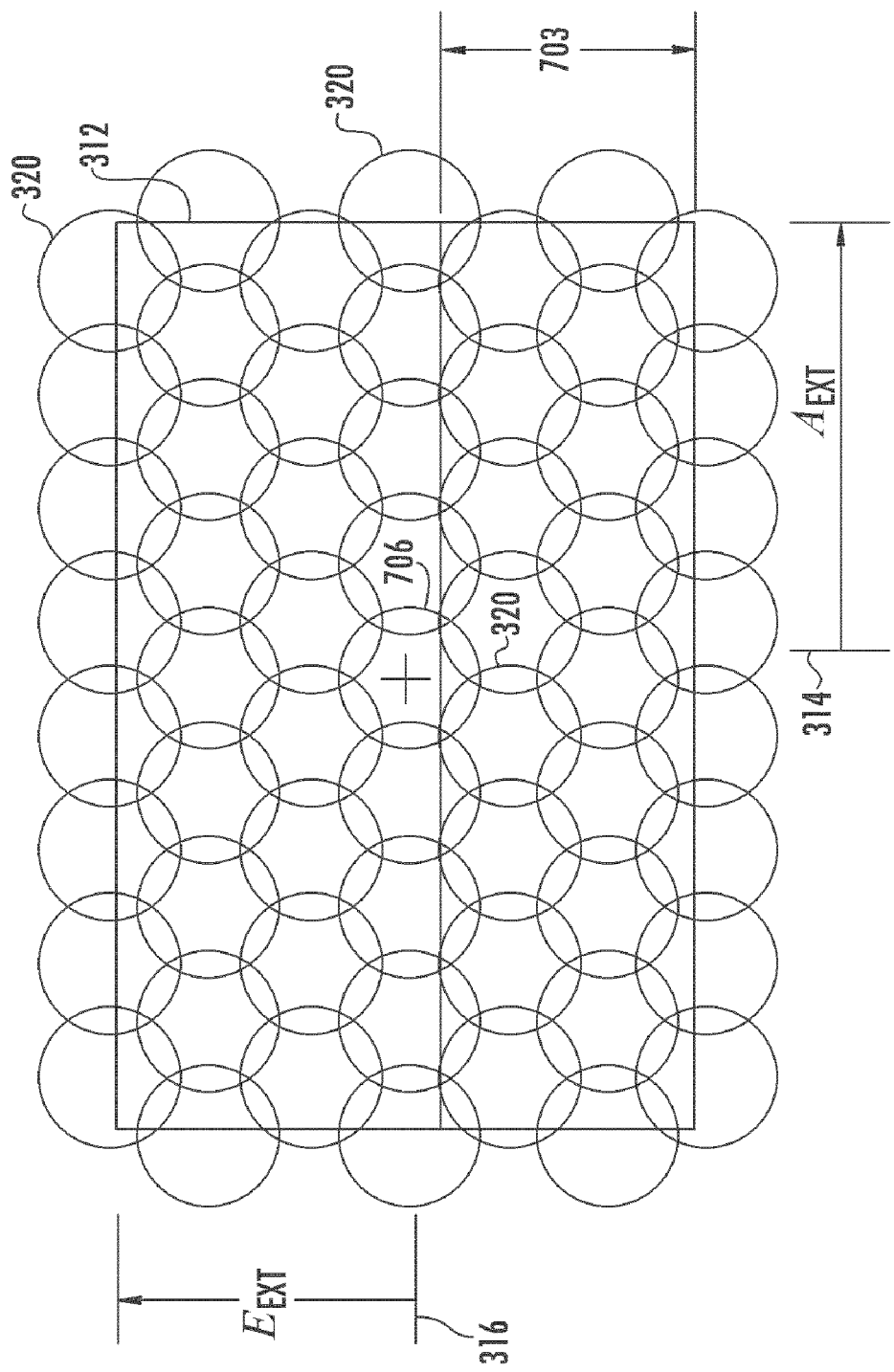
FIG. 8A is a view of a partitioned search face based on an unpartitioned volume.

FIG. 8A is a view of a partitioned search face of an unpartitioned volume in accordance with an embodiment of the present disclosure. The search face is partitioned generally because the acquisition search volume is too large to be searched within the limited search time available. In FIG. 8A, the search face, depicted generally by reference numeral 312, is covered by a beam pattern comprising, for example, 59 beams 320. The acquisition face of a first partition 703 is described by the unpartitioned azimuth extent ($A_{ext}$) and the elevation extent ($E_{ext}$) of Equation 18, along with the azimuth and elevation centers 314, 316, respectively. The first partition 703 is the portion of the unpartitioned volume below partition line 706. By calculating the remaining unpartitioned volume the radar system can derive a more accurate estimate of the size of the searchable acquisition volume.

The partition line 706 represents the maximum elevation of the first partition 703 (and the lowest elevation of the subsequent partition). The beam pattern illustrated in FIG. 8A is that used to cover the search face 312 of the unpartitioned volume, not the partition 703.

Figure 8B:
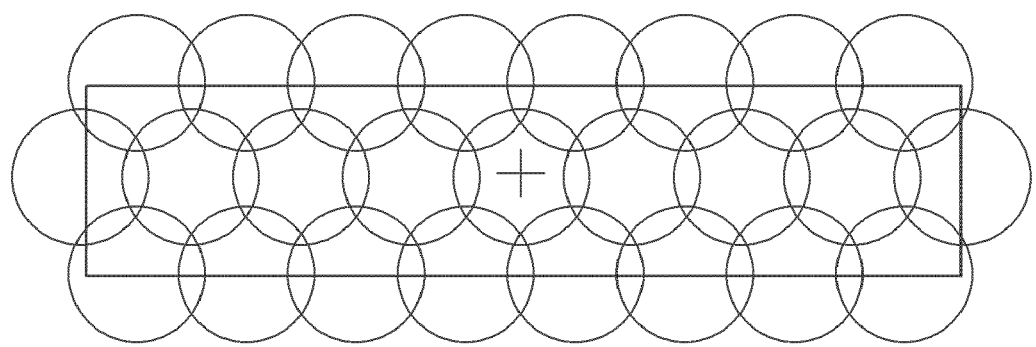
FIG. 8B is a view of a beam pattern used to cover the unpartitioned volume of FIG. 8A.

FIG. 8B is a view of a beam pattern used to cover the first partition 703 of the unpartitioned volume of FIG. 8A. The first partition 703 of the unpartitioned volume can be calculated by using Equations 14-18. In Equation 14, $T_0$ is the time to search the entire acquisition search face 312 in FIG. 8A (59 beams 320), $T_{ave}$ is the time to search a row of approximately 8.5 beams in this specific example, and the number of beam rows $n_E$ per partition is found from Equation 15, which is described above.

As mentioned previously, 2k+1 is the number of beam rows that can be searched within the allowed acquisition period. Incomplete rows are eliminated by the floor function of equation 16. It should be noted that the number of beam rows is odd. This result is specific to the manner of radar search where the initial beam is placed at the center 805 of the volume or partition 703. Because there are an odd number of rows the calculation of beam rows using Equation 16 is not exact. For example, let $t_{dwell}$ be the dwell time for a single beam. There will rarely occur cases 1) where two rows are included although the true search time for the calculated number of rows is up to $t_{dwell}$ too long, and 2) where the outer rows are excluded because the calculated search time is up to $t_{dwell}$ too long. Equation 17 can be used to calculate the beam rows where Equation 16 is deficient. Equation 18 can be used to calculate the elevation extent of the acquisition search face 312 below the partition line 706 (FIG. 8B).

What is claimed is:

1. A method for partitioning a radar acquisition volume, the method comprising the steps of:
    determining, using a radar beam control, an allocated time to search an unpartitioned volume;
    determining a number of beam rows in an unpartitioned acquisition face;
    determining an average per-row search time for searching an angular region based on the determined allocated time and determined number of beam rows in an unpartitioned acquisition face;
    determining a number of beam rows in an allotted acquisition period that is searchable based on the average per-row search time;

calculating a maximum elevation extent based on the number of beam rows in the allotted acquisition; and searching, by an antenna face controlled by the radar beam control, an angular extent of the search volume based on the calculated maximum extent.

2. The method of claim 1, wherein the calculation of the maximum elevation extent is performed using the radar beam control and comprises determining an average search time of each row of the beams in the allotted acquisition period.

3. The method of claim 1, wherein the calculation of the number of beam rows in the allotted acquisition period is based on the condition that a total time to search the number of beam rows in an unpartitioned acquisition face is less than a maximum allowable search time.

4. The method of claim 1, wherein the calculation of the number of beam rows in the allotted acquisition period is based on a condition that the number of beam rows in the allotted acquisition period is expanded to at least one outer row.

5. The method of claim 1, wherein the calculation of the maximum elevation extent comprises adding an elevation pad to an extent sent.

6. A method for calculating, using a radar beam control, a maximum extent in an allotted acquisition period that is used to partition a search volume of an angular region of a radar acquisition volume, the method comprising the steps of:

determining, using the radar beam control, an average search time of each row of beams, wherein the determined average search time is based on a number of beam rows in an unpartitioned acquisition face;

calculating a number of beam rows in the allotted acquisition period that is searchable in the allotted acquisition period based on the determined average search time; and estimating a maximum elevation extent that is searchable by the number of beam rows in the allotted acquisition period.

7. The method of claim 6, further comprising adding an elevation pad to an extent sent.

8. The method of claim 6, wherein the calculation of the number of beam rows in the allotted acquisition period is based on the condition that a total time to search the number of beam rows is less than a maximum allowable search time.

9. The method of claim 6, wherein the calculation of the number of beam rows in the allotted acquisition period is based on the condition that the number of beam rows in the allotted acquisition period is expanded to at least one outer row.

10. A system for partitioning a radar acquisition volume comprising:

a command and decision unit that determines an azimuth and elevation extent of a search volume about a cue direction and angular extents of beams in azimuth and elevation based on defined bandwidths of the beams; and a radar beam control that is electrically coupled to the command and decision unit, wherein the radar beam control includes the following operations:

from the angular extents in azimuth and elevation for each beam, determine a number of beams required to cover a search face, determine a maximum allowable search time for searching the angular region, determine a search time based on the determined number of beams, compare the search time with the maximum allowable search time, if the search time is greater than the maximum allowable search time, determine a maximum search elevation that is used as an allotted acquisition period, determine an allocated time to search an unpartitioned volume, determine a number of beams rows in an unpartitioned acquisition face, determine an average per-row search time for searching the angular region based on the determined allocated time and determined number of beam rows in an unpartitioned acquisition face, determine a number of beam rows in an allotted acquisition period that is searchable based on the average per-row search time, calculate a maximum elevation extent based on the number of beam rows in the allotted acquisition period, and search a full angular extent of the search volume based on the calculated maximum extent.

11. The system of claim 10, wherein the radar beam control determines an average search time of each row of the beams.

12. The system of claim 10, wherein the radar beam control calculates of the number of beam rows in the allotted acquisition period based on a condition that a total time to search the number of beam rows is less than the maximum allowable search time.

13. The system of claim 10, further comprising a radar mode unit that is electrically coupled to the radar beam control, wherein the radar mode unit sends instructions to the radar beam control to operate in a different mode based on the condition that the number of beam rows in the allotted acquisition period is expanded to at least one outer row.

14. The system of claim 13, wherein the radar beam control estimates the maximum extent that is searchable by the number of beam rows in the allotted acquisition period based on the instructions received from the radar mode unit.

15. The system of claim 14, wherein the radar beam control adds an elevation pad to an extent sent.

* * * * *